United States Patent
Tranvouez-Bernardin et al.

(10) Patent No.: US 12,044,903 B2
(45) Date of Patent: Jul. 23, 2024

(54) METHOD FOR DETERMINING AN OPTICAL CRITERION FOR A DESIGN OF A SPORT-ADAPTED OPTICAL LENS

(71) Applicant: Essilor International, Charenton-le-Pont (FR)

(72) Inventors: Delphine Tranvouez-Bernardin, Charenton-le-Pont (FR); Mélanie Heslouis, Charenton-le-Pont (FR); Laurent Calixte, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 806 days.

(21) Appl. No.: 17/256,846

(22) PCT Filed: Jul. 24, 2019

(86) PCT No.: PCT/EP2019/069879
§ 371 (c)(1),
(2) Date: Dec. 29, 2020

(87) PCT Pub. No.: WO2020/020928
PCT Pub. Date: Jan. 30, 2020

(65) Prior Publication Data
US 2021/0109376 A1   Apr. 15, 2021

(30) Foreign Application Priority Data
Jul. 24, 2018 (EP) .................................... 18306004

(51) Int. Cl.
*G02C 7/02* (2006.01)
*G02C 7/06* (2006.01)

(52) U.S. Cl.
CPC ............. *G02C 7/027* (2013.01); *G02C 7/025* (2013.01); *G02C 7/061* (2013.01)

(58) Field of Classification Search
CPC ......... G02C 7/027; G02C 7/025; G02C 7/061
(Continued)

(56) References Cited

U.S. PATENT DOCUMENTS

| 6,199,983 B1 | 3/2001 | Kato et al. |
| 7,338,163 B2 | 3/2008 | Carimalo et al. |

(Continued)

FOREIGN PATENT DOCUMENTS

| FR | 2 924 825 A1 | 6/2009 |
| WO | WO 2017/157760 A1 | 9/2017 |

OTHER PUBLICATIONS

International Search Report and Written Opinion issued Oct. 7, 2019 in PCT/EP2019/069879 filed Jul. 24, 2019.

Primary Examiner — James R Greece
(74) Attorney, Agent, or Firm — Oblon, McClelland, Maier & Neustadt, L.L.P.

(57) ABSTRACT

A method for determining an optical design criterion for designing an optical lens adapted to a sport practice, the method including: defining an evaluation axis for evaluating sensory/motor/cognitive requirement of a sport practice, for each of a plurality of sports; attributing a score to the sport practice on each evaluation axis; determining clusters of sports in which practices have similar score; determining at least one visual need corresponding to each cluster of sports; determining, for each cluster, at least one optical design criterion as a function of the associated visual need; and storing in a memory a record for each cluster, along with each optical design criterion associated with the cluster.

15 Claims, 5 Drawing Sheets

(58) Field of Classification Search
USPC .................................................. 351/159.42
See application file for complete search history.

(56) References Cited

U.S. PATENT DOCUMENTS

| | | |
|---|---|---|
| 8,210,679 B2 | 7/2012 | Varnas et al. |
| 8,303,113 B2 | 11/2012 | Esser et al. |
| 8,356,896 B2 | 1/2013 | Esser et al. |
| 2005/0122472 A1* | 6/2005 | Fisher ...................... G02C 7/02 |
| | | 351/159.73 |
| 2010/0157242 A1 | 6/2010 | Esser et al. |
| 2010/0321633 A1 | 12/2010 | De Rossi et al. |
| 2011/0043754 A1 | 2/2011 | Hatanaka |
| 2011/0222019 A1 | 9/2011 | Suzuki et al. |
| 2017/0059886 A1 | 3/2017 | Fayolle et al. |
| 2019/0113770 A1 | 4/2019 | Tranvouez-Bernardin et al. |

\* cited by examiner

METHOD FOR DETERMINING AN OPTICAL CRITERION FOR A DESIGN OF A SPORT-ADAPTED OPTICAL LENS

FIELD OF THE INVENTION

The invention relates to a method for determining an optical design criterion for designing an optical lens adapted to a selected sport practice, and to a method for determining an optimized optical lens for a selected wearer, according to the sports he practices and its level of practice.

BACKGROUND OF THE INVENTION

Different sport practices can involve different visual needs for the user, which must be addressed specifically. For instance, a sport like football involves a highly dynamic and unstable environment, with directions of action often changing in direction, unlike golf which involves a stable environment and direction of action but needs sharp vision at far distances.

To address the specific visual needs of a sport practice, some solutions have been proposed which are either quite generalist or on the contrary dedicated to a particular sport.

For instance some sunglasses available on the market exhibit specific tints adapted to the sport environment such as snow or sea, and the frame of the sunglasses can also be adapted to the sport environment. However the lenses of these sunglasses are not adapted to the sport practice.

Other solutions provide lenses that have been developed especially for the practice of a particular sport such as golf or sailing. These lenses are thus very specific and not used for other sports, even though the practice of these sports may share some visual needs with the sport for which the lenses have been designed.

There is therefore no intermediate offer, of lenses which design is adapted to various sports having the same visual needs, which would represent a good compromise between performance and cost.

Additionally it can be noted that there is a current trend to adapt the design of a lens to the activities of the wearer. For instance document U.S. Pat. No. 7,980,692 discloses the determination of a lens design according to the activities of the wearer and a time spent in its different daily activities. However this document does not address the specificity of various sport practices.

Document U.S. Pat. No. 8,303,113 presents a method for designing a progressive lens, by taking into account the driving and sport activities of the wearer to determine the position of the Far Vision/Near Vision areas. This document however does not discriminate between various sports practices.

Document FR2924825 also discloses a method for designing a progressive optical lens, wherein the addition can be reduced according to the prescription, and depending upon the reading needs during the sport activities. According to this document, the only design parameter which is adapted to the sport practice is the addition.

PRESENTATION OF THE INVENTION

In view of the above, there is a need to provide a cost effective manner to design an optical lens according to the type of sport practiced by a wearer.

The invention aims at solving this problem.

Another aim of the invention is to determine design criteria for designing an optical lens according to categories of sports having the same visual needs.

Accordingly, a method for determining an optical design criterion for designing an optical lens adapted to a selected sport practice is disclosed, the method comprising:
 defining at least one evaluation axis for evaluating sensory and/or motor and/or cognitive requirements or a combination thereof of a sport practice,
 for each of a plurality of sports, attributing a score to the sport practice on each defined evaluation axis,
 according to the score of each sport practice on each evaluation axis, determining clusters of sports which practices have similar scores,
 determining, for each cluster of sports, at least one visual need corresponding to the cluster,
 determining, for each cluster, at least one optical design criterion as a function of the associated visual need, wherein the optical design criterion is an optimization parameter to be used in the designing of an optical lens, and
 storing, in a memory, a record of each cluster including the list of sports belonging to the cluster, along with each optical design criterion associated to the cluster.

Similar scores of sport practices are typically scores having the same order of magnitudes on the evaluation axis, or comprised between common lower and upper limits. As another example, two scores are similar if having a difference lower than a predetermined threshold. The threshold value can depend upon the values of the scores on the evaluation axis.

The score attributed on the evaluation axis depends upon the sensory/motor/cognitive requirements of the sport practice. For example, sport practices involving body movements of same general amplitudes can haven similar scores on an evaluation axis. Sport practices involving looking at a faraway target may also have similar scores on an evaluation axis.

In one embodiment, the above method is performed by a device comprising a processor and a memory, and the record of each cluster is stored by the device in the memory along with each optical design criterion associated to the cluster.

In an embodiment, one evaluation axis relates to the visual information uncertainty of the environment of a user practicing the sport, and one evaluation axis relates to a type of action implied by the sport practice. One supplementary evaluation axis may relate to the type of location where the sport practice is performed.

The axis defining the type of location may be various. For instance the location may be characterized by being indoor/outdoor, planar of hilly, surrounded by fences or without limits, large or restricted, exposed to the sun or shady, moving (sea) or stable, etc.

The determination of a visual need corresponding to a cluster of sports may comprise at least one of the following:
 evaluation at least one main gaze direction,
 evaluation of the width of the field of view,
 characterization of the visual motion and/or visual self/motion implied by the sport practice and purpose of the visual motion,
 characterization of the need for distance and/or orientation perception implied by the sport practice,
 evaluation of an amount of luminosity and/or contrast variation
 evaluation of a need of coordination between eye movement and the body segments of a practicing person evaluation of the use of a master eye during the sport practice, evaluation of a need of relief perception, evaluation of a monocular and/or binocular visual need implied by the sensory or motor eye dominance of the sport practice, evaluation of a need of visual acuity.

The visual need corresponding to a cluster of sports may be one or a combination of elements of a list consisting of:

Visual motion,

Ground perception,

Fidelity of object,

Objects, animals or persons motion perception,

Uniform perception of the environment,

Uniform perception of displacements of a tracked object, animal or human being,

Sharp vision in target gaze direction,

Equilibrium in peripheral vision.

In embodiments, the method further comprises elaborating, from the determined visual needs, a visual field of action corresponding to a cluster of sports, wherein the visual field of action represents gaze directions of main importance among all gaze directions available given the eye, head and body motion implied by the sport practices of the cluster of sports, and the step of determining at least one optical design criterion for the cluster is implemented based on said visual field of action.

The optical design criterion is preferably selected among the following group:

position and level of powers and/or aberrations in a multi-focal progressive lens, position and level of powers and/or aberrations in a mono-focal lens, size and/or shape of monocular and binocular field, gradient of astigmatism and/or power, stability of the magnification power of a lens according to the eye eccentricity, presence of a UV-protective coating, presence of a blue light-protective coating, gradient of retinal flow, gradient of magnification, global distortions according to the eye eccentricity, retinal and/or optical flow, and/or is selected among one of the following groups:

central vision criteria group consisting of: power in central vision, astigmatism in central vision, higher-order aberration in central vision, acuity in central vision, contrast in central vision, prismatic deviation in central vision, ocular deviation, object visual field in central vision, image visual field in central vision, magnification in central vision and a variation of preceding criteria, peripheral vision criteria group consisting of: power in peripheral vision, astigmatism in peripheral vision, higher-order aberration in peripheral vision, pupil field ray deviation, object visual field in peripheral vision, image visual field in peripheral vision, magnification in peripheral vision and a variation of preceding criteria, global optical criteria consisting of: magnification of the eyes and temple shift.

In embodiments, the step of determining, for each cluster, at least one optical design criterion may also comprises a step of determining a design rule associated to the optical design criterion, the design rule allowing the determination of a value of the optical design criterion.

In an embodiment, the step of determining clusters comprises determining the following clusters:

a first cluster of sports performed in a stable environment and dedicated to acquisition or reproduction of body postures, for example said first cluster including at least the following sports: yoga, dance, aerobic, step;

a second cluster of sports performed in a stable environment and dedicated to shoot or aim at a target, for example said second cluster including at least the following sports: fishing, archery, golf, ball-trap;

a third cluster of sports performed in a visually unstable environment and involving forward displacement, for example said third cluster including at least the following sports: cycling, running, walking, horse-riding, skiing, and a fourth cluster of sports performed in a visually unstable environment and involving frequent changes of directions, for example said fourth cluster including at least the following sports: table tennis, handball, football, tennis.

According to this embodiment, the optical design criterion associated to the clusters of sports is preferably:

for the first cluster of sports: a level of global distortions, for the second cluster of sports: a level of aberrations in the central zone of the lens for the third cluster of sports, a retinal optic flow, for the fourth cluster of sports: a variation of magnification for a large set of eye directions.

and a rule of design associated to each criterion may be:

for the first cluster of sports: reducing the optical design criterion, for the second cluster of sports: minimizing the optical design criterion, for the third cluster of sports: homogenizing the optical design criterion, and for the fourth cluster of sports: reducing the optical design criterion.

According to another object of the invention, a method for determining an optimized optical lens design for a selected wearer is disclosed, the method being performed by a processor, the processor being connected to a memory storing records of clusters of sports wherein sports practices of a cluster of sports have similar scores on at least one evaluation axis for evaluating sensory and/or motor and/or cognitive requirements of a sport practice, and each cluster of sports is associated with an optical design criterion which is determined as a function of a visual need induced by the sensory and/or motor and/or cognitive requirements of the sport practices of the cluster of sports, the method comprising:

receiving a request comprising an optical prescription and sport practice information relating to an optical device wearer, interrogating the memory to infer, based on the sport practice information, at least one cluster of sports applicable to the wearer and the associated optical design criterion, and determining an optical design of an optical lens according to both the optical design criterion and the optical prescription.

In embodiments, the sport practice information is obtained from an input device connected to the processor or from a database. The sport practice information can comprise at least information regarding the type of sport performed by the wearer, and can further comprise information regarding at least one of:

the playing level of the wearer in each sport, the relative intensity and/or frequency of each sport practice.

In embodiments, the method further comprises, if more than one cluster is determined based on the sport practice information, a step of determining weighing factors of each optical design criterion associated to a determined cluster, based on information regarding the playing level or relative intensity or frequency of each sport practice.

In an embodiment, at least two optical design criteria are associated to the inferred cluster, and the method further comprises determining weighing factors of each optical design criterion associated to the inferred cluster, based on information regarding the playing level or relative intensity or frequency of each sport practice corresponding to the inferred cluster.

According to another object of the invention, a non-transitory computer readable storage medium storing a program causing a computer to execute at least one of methods hereinabove is disclosed.

According to still another object of the invention, a device for selecting an appropriate optical design criterion as a function of an activity is disclosed, the device comprising:
  a memory storing a record of clusters of sports along with at least one optical design criterion associated to each cluster, wherein sports practices of a cluster of sports have similar scores on at least one evaluation axis for evaluating sensory and/or motor and/or cognitive requirements of a sport practice, and the at least one optical design criterion is determined as a function of a visual need induced by the sensory and/or motor and/or cognitive requirements of sport practices of the cluster of sports, and
  a processor configured to interrogate the memory to infer, from sport practice information associated to an optical device wearer, an optical design criterion applicable to the design of a lens adapted to the wearer.

The record of clusters of sports comprises a definition of the clusters of sports including an identifier of the cluster, the list of each sport included in the cluster, and optionally the values of each sport included in the cluster on each evaluation axis, and/or the minimum and maximum values on each evaluation axis with which a sport may be included in the cluster.

In a preferred embodiment, the clusters of sports comprise at least two clusters selected in the list consisting of:
  a first cluster of sports performed in a stable environment and dedicated to acquisition or reproduction of body postures, for example said first cluster including at least the following sports: yoga, dance, aerobic, step;
  a second cluster of sports performed in a stable environment and dedicated to shoot or aim at a target, for example said second cluster including at least the following sports: fishing, archery, golf, ball-trap;
  a third cluster of sports performed in a visually unstable environment and involving forward displacement, for example said third cluster including at least the following sports: cycling, running, walking, horse-riding, skiing, and
  a fourth cluster of sports performed in a visually unstable environment and involving frequent changes of directions, for example said fourth cluster including at least the following sports: table tennis, handball, football, tennis.

According to this embodiment, the optical design criterion associated to the clusters of sports is preferably:
  for the first cluster of sports: a level of global distortions,
  for the second cluster of sports: a level of aberrations in the central zone of the lens
  for the third cluster of sports, a retinal optic flow,
  for the fourth cluster of sports: a variation of magnification for a large set of eye directions.

In embodiments, the processor is further configured to determine, based on the optical design criterion and an optical prescription of the wearer, an optical design of an ophthalmic lens of the wearer.

In embodiments, the device may further comprise an input device adapted to input the sport practice information associated to the optical device wearer, and a display for displaying at least the optical design criterion inferred from said sport practice information.

According to another objet, the invention may further propose
  a record for determining an optical design criterion for designing an optical lens adapted to a selected sport practice, wherein the record comprises determined clusters comprising
    a first cluster of sport practices performed in a stable environment and dedicated to acquisition or reproduction of body postures, for example said first cluster including at least the following sport practices: yoga, dance, aerobic, step;
    a second cluster of sport practices performed in a stable environment and dedicated to shoot or aim at a target, for example said second cluster including at least the following sport practices: fishing, archery, golf, ball-trap;
    a third cluster of sport practices performed in a visually unstable environment and involving forward displacement, for example said third cluster including at least the following sport practices: cycling, running, walking, horse-riding, skiing, and
    a fourth of sport practices performed in a visually unstable environment and involving frequent changes of directions, for example said fourth cluster including at least the following sport practices: table tennis, handball, football, tennis.
  each associated to an optical design criterion.

The invention may also comprise a non-transitory computer readable storage medium storing the record hereinabove.

The elaboration of clusters of sports having common visual needs allows proposing to sport wearers a lens design which is best adapted to their practice than a generalist design, while not requiring fully designing a lens for a particular sport. A compromise is thus achieved between performance and design and production costs.

DESCRIPTION OF THE DRAWINGS

Other features and advantages of the invention will be apparent from the following detailed description given by way of non-limiting example, with reference to the accompanying drawings, in which.

DETAILED DESCRIPTION OF AT LEAST AN EMBODIMENT OF THE DESCRIPTION

Figure 4:
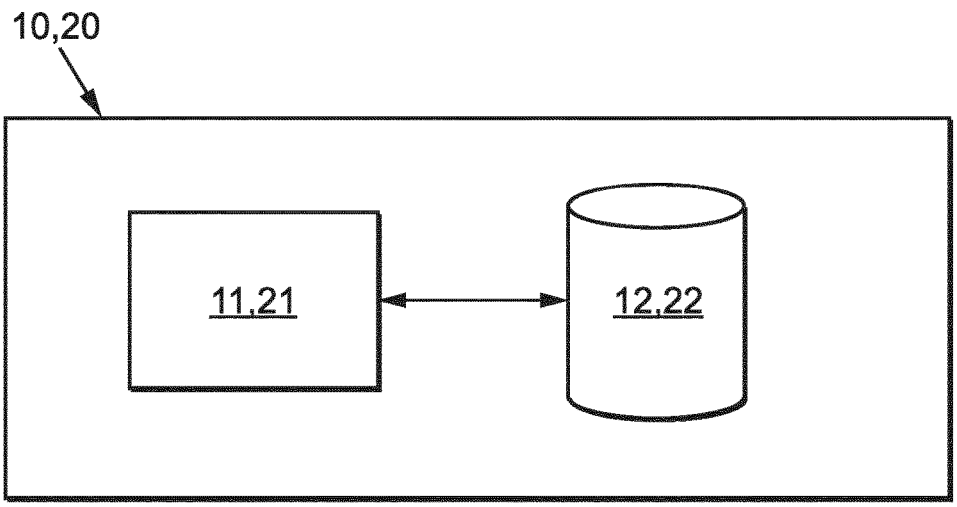
Figure 5:
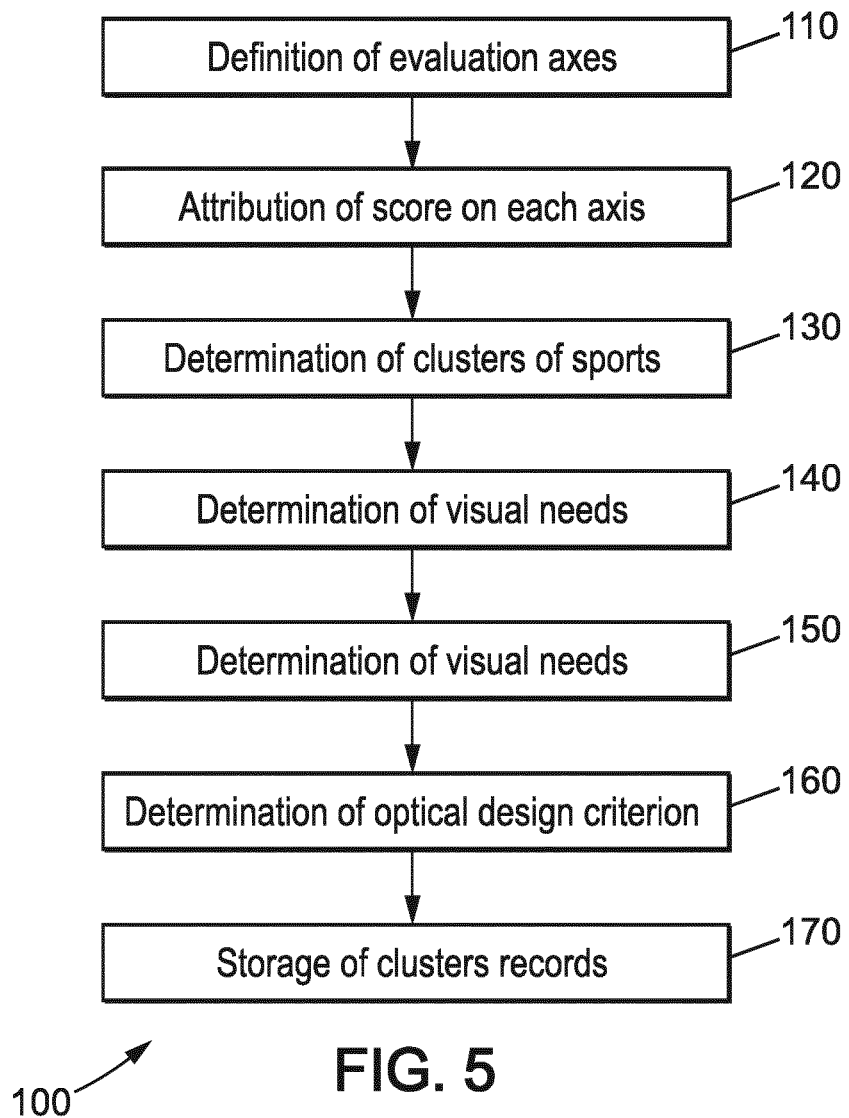

With reference to FIG. 5, a method 100 for determining at least an optical design criterion for designing an optical lens according to a sport practice will now be disclosed. This method is preferably performed by a computing device 10 comprising a processor 11 and a memory 12, such as the computing device shown for instance in FIG. 4. The memory 12 stores code instructions which can be executed by the processor 11 to implement the method 100.

The method is based on the definition of groups of sports, or clusters of sports, having common sensory and/or motor and/or cognitive requirements, involving vision, and hence having common visual needs.

To this end, the method comprises a first step 110 of defining at least one evaluation axis for evaluating sensory and/or motor, and/or cognitive requirements, or a combination thereof, of at least a sport practice, and preferably of a number of sport practices that one wish to classify into clusters.

Preferably, at least two axes are defined for evaluating different types of requirements.

According to a preferred, yet non limiting embodiment, at least two axes are defined based on main criteria determined by Poulton in the publication "On prediction in skilled movements", in Psychological bulletin, 1957.

The first axis relates to the goal of action involved during the sport practice, and distinguishes between the two following opposite categories:

- a closed loop sport based on body shape and posture reproduction, wherein the goal is to perform an action in reproducing body shape, posture, and involving coordination or motion independent of the environment,
- an interaction and displacement sport in which the goal is to act with, and in function of the environment.

The second axis relates to the environment of practice and distinguishes between two opposite categories of environment based on the uncertainty of information provided by the environment:

- on a first end of the axis is a stable environment, in which the environment does not change during the practice, and thus the related activity is based on automaticity and learning,
- on a second end of the axis is an unstable environment, wherein the environment changes physically and/or visually during the sport practice, either because of motion of the wearer within the environment, or because of interaction with other players. The activity hence requires decision making, attention, memory and requires perceptive and cognitive abilities to plan and execute actions.

Figure 1:
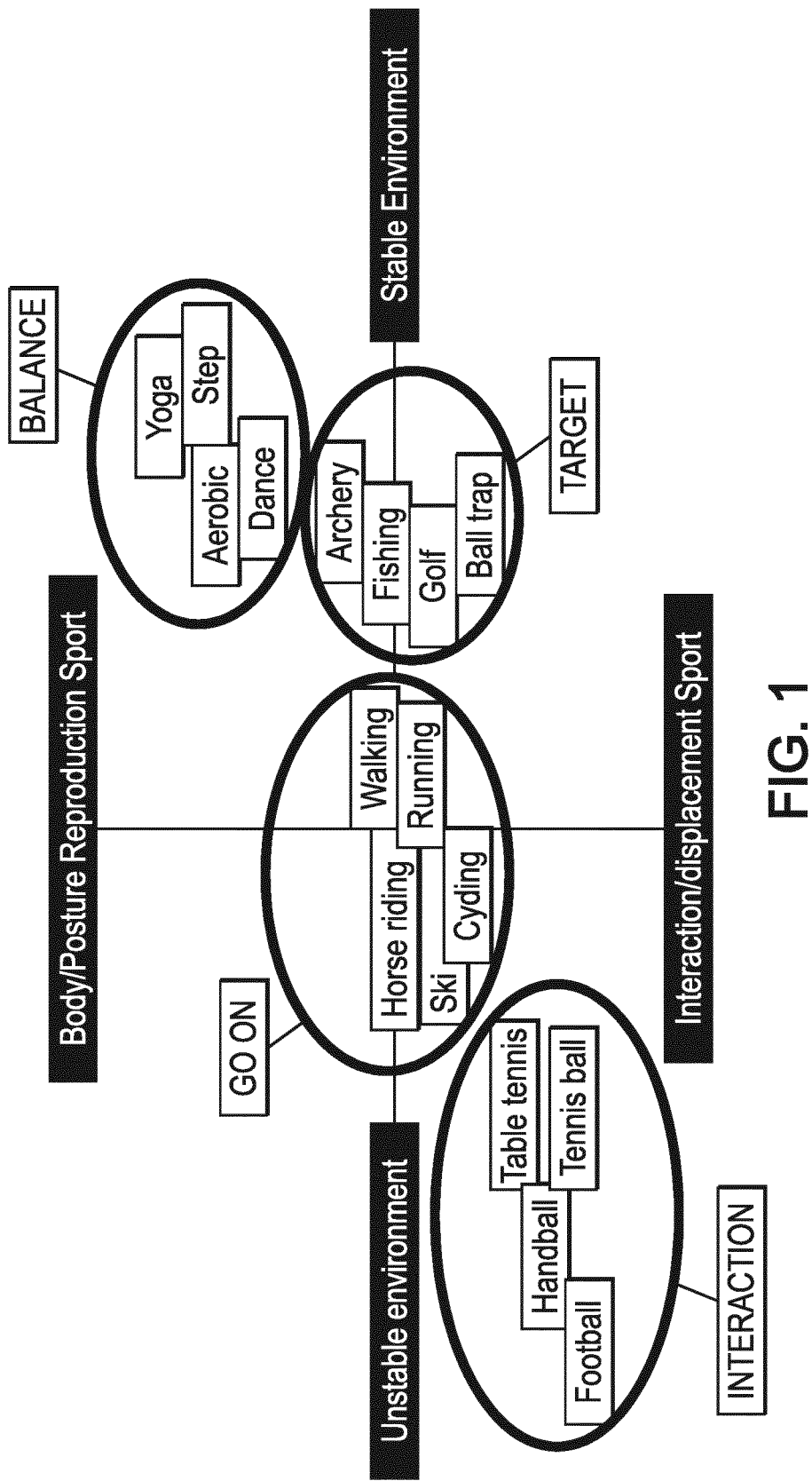
FIG. 1 represents an example of clusters of sports and the evaluation axes used to determine said clusters, FIG. 2 schematically represents the visual needs corresponding to each cluster of sports, determined from the sensory, motor and cognitive requirements of each cluster.

With reference to FIG. 1, these two axes are shown in a plane representation.

However the axes may comprise at least a third axis, for instance an axis relating to a type of location where the sport is performed. The characterization of the location may relate to the location being indoor/outdoor, planar of hilly, surrounded by fences or without limits, large or restricted, exposed to the sun or shady, moving (sea) or stable, etc.

Back to FIG. 5, the method then comprises a step 120 of attributing to each sport practice for a plurality of sports, a score on each evaluation axis defined at step 110. The score attributed to a sport practice depends upon the sensory and/or motor and/or cognitive requirements of the sport, which are evaluated by the axis. For example, sport practices involving body movements of same general amplitudes can haven similar scores on an evaluation axis. Sport practices involving looking at a faraway target may also have similar scores on an evaluation axis.

In an embodiment, if a plurality of sports have to be attributed a score for each evaluation axis, the scores can be attributed by comparing relative requirements of the sports among the plurality of score.

Back to FIG. 1, are shown the relative scores attributed to each score practice on each of the two axes defined previously for the following, non-limiting and non-exhaustive list of sports:

aerobic
archery,
ball trap,
cycling,
Dance,
Fishing,
Football
Golf,
Handball
Horse Riding,
Running,
Ski,
Step,
Table tennis,
Tennis ball,
Walking,
Yoga.

For instance as the sports such as aerobic, archery, fishing are performed in a stable environment, they are positioned on a same side of the axis qualifying the environment stability, whereas sports such as collective sports are positioned on an opposite end of the axis.

Moreover, sports such as dance or aerobic, involving reproduction of postures are positioned on one end of the axis evaluating the goal of action, whereas ball sports are positioned on the other end.

The method then comprises a step 130 of determining cluster of sports which practices have similar scores on all the evaluation axes defined at step 110.

Similar scores of sport practices are typically scores having the same order of magnitudes on the evaluation axis, or comprised between common lower and upper limits. As another example, two scores are similar if having a difference lower than a predetermined threshold. The threshold value can depend upon the values of the scores on the evaluation axis or upon the cluster.

On FIG. 1, four exemplary clusters are defined based on the scores of the practice of each previously listed sport on the two above-defined axes.

A first cluster includes sports performed in a stable environment and dedicated to acquisition or reproduction of body postures, i.e. having high values in the end of the "goal of action axis" directed to body/posture reproduction sports, and high values in the end of the environment axis directed to stable environment. Among the above list of sports the first cluster includes the following: yoga, dance, aerobic, step. Said cluster will be named "BALANCE" in the following.

A second cluster includes sports performed in a stable environment and dedicated to shoot or aim at a target, i.e. having average values on the "goal of action axis", and having high values in the end of the environment axis directed to stable environment. Among the above list of sports, the second cluster includes the following: fishing, archery, golf, ball-trap. Said cluster will be named "TARGET" in the following.

A third cluster includes sports performed in a visually unstable environment and involving forward displacement, i.e. having average values in the "goal of action axis" and having values on a side of the environment axis directed to unstable environment. Among the above list of sports, the third cluster includes the following sports: cycling, running, walking, horse-riding, skiing. Said cluster will be named "GO ON" in the following.

A fourth cluster includes sports performed in a visually unstable environment and involving frequent changes of directions, i.e. having high values in the end of the "goal of action" axis directed to interaction/displacement sports, and high values in the end of the environment axis directed to unstable environment. Among the above list of sports, the fourth cluster includes the following: table tennis, handball, football, tennis. Said cluster will be named "INTERACTION" in the following.

Of course the clusters of sports depend upon the sports from which the clusters are built and from the axes chosen for evaluating the sensory/motor/cognitive needs of the sports.

During a next step 140, the method comprises the determination of at least one visual need corresponding to the cluster, i.e. at least one visual need that is common to all sports belonging to the cluster. Of course, this step can comprise the determination of more than one visual need, for instance a combination of visual needs that is specific to a cluster.

The visual need is determined according to the characteristics of the sports belonging to the clusters in terms of motion and cognition.

Depending on the cluster, the determination of the visual need may comprise:
  Evaluation of at least one main gaze direction,
  evaluation of the width of the field of view of the wearer during the practice,
  characterization of the visual motion and/or visual self-motion implied by the sport practice and purpose of the visual motion,
  characterization of the need for distance and/or orientation perception implied by the sport practice,
  evaluation of an amount of luminosity and/or contrast variation
  evaluation of a need of coordination between eye movement and the body segments of a practicing person
  evaluation of the use of a master eye during the sport practice,
  evaluation of a need of relief perception,
  evaluation of a monocular and/or binocular visual need implied by the sensory or motor eye dominance of the sport practice,
  evaluation of a need of visual acuity.

The visual need corresponding to a cluster of sports may be one or a combination of elements of a list consisting of:
  Visual motion,
  Ground perception,
  Fidelity of object,
  Objects, animals or persons motion perception,
  Uniform perception of the environment,
  Uniform perception of displacements of a tracked object, animal or human being,
  Sharp vision in target gaze direction,
  Equilibrium in peripheral vision.

For instance, sports belonging to the "Interaction cluster" require good perception of motion, in particular good fidelity of objects and persons motion perception. Indeed, while performing an interaction sport, a sportsman needs to maintain a uniform perception of the environment and displacements of tracked ball, opponents and partners.

The main visual need for sports belonging to the "target" cluster is a sharp vision in the target gaze direction.

Sports belonging to the "go on" cluster require good visual motion and ground perception.

Sports belonging to the "balance" cluster require good equilibrium and peripheral vision.

In an embodiment, the determination 140 of visual needs of a cluster of sports can be performed by determining a so-called visual field of action of the sports belonging to the cluster. The visual field of action is the projection, on a lens or a field of view representing the field of view seen by a lens, of the areas of the field of view which are most involved.

Figure 2:
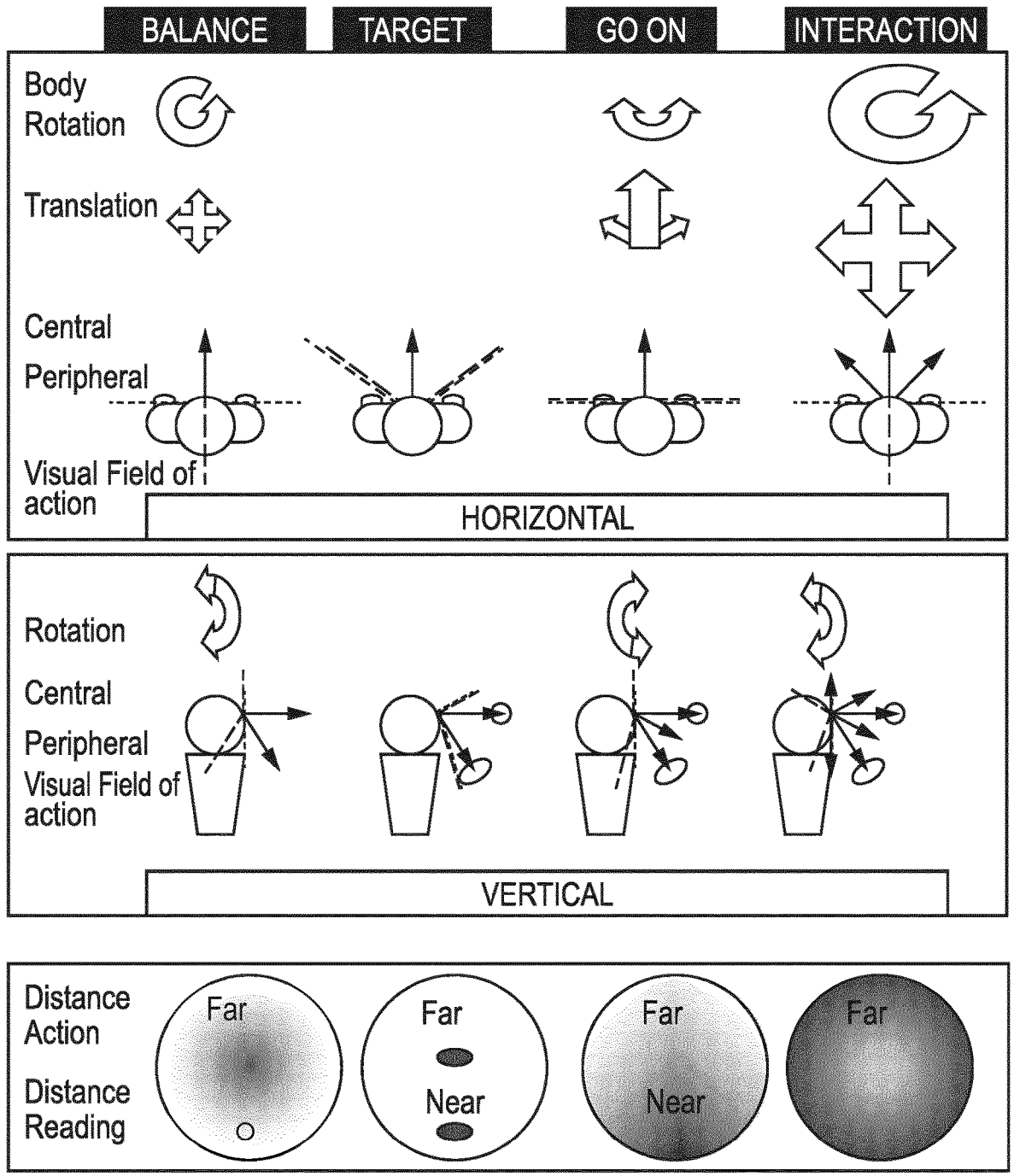

With reference to FIG. 2, visual fields of action are elaborated for each of the previously defined clusters. To define a field of action, the amount of motion of the body and direction of gaze of the wearer is evaluated in both horizontal and vertical directions, as shown in FIG. 2.

To continue the example given above, sports belonging to the cluster "Balance" may require body rotation and translation in both horizontal and vertical directions, although the direction of gaze is mainly straight forward, mainly at a far distance and occasionally at a short distance. The visual field of action is summed up by an area of far vision and a localized spot of near vision.

Sports belonging to the cluster "TARGET" involve very few body rotation or translation and few gaze motion either in both horizontal and vertical direction, and the direction of gaze is straight forward, either at long distance (reaching the target) or short distance, for instance for reading. The visual field of action is summed up by two localized spots, one of far vision and one of near vision.

Sports belonging to the cluster "GO ON" mainly involve a straight forward gaze direction, although some rotation of the gaze may be involved at short distance. The visual field of action is summed up by a diffuse area mainly in the straightforward direction and mainly in short distance.

Last, sports belonging to the cluster "Interaction" involve a high amount of body and gaze motion in any direction. The visual field of action is summed by a diffuse area covering all gaze directions.

The visual field of action determined for a given cluster can form a summary of the visual needs for a cluster. Alternatively, the visual field of action for a given cluster may be completed by additional visual needs.

The method then comprises the determination 150 of at least an optical design criterion as a function of the at least one visual need associated to the cluster. The optical design criterion is an optimization parameter to be used in the designing of an optical lens. Therefore the optical design criterion does not set the entire design of the optical lens but determines at least one optimized parameter in the design of the lens in order to fulfill the visual need of the cluster.

If several visual needs are associated to a same cluster, the or each optical design criterion can be deduced from the most important visual need, or one optical design criterion can be deduced for each of the visual needs. In that case for a given wearer, weights for each optical design criterion can be determined according to particulars of the wearer (see description below).

If embodiments, each optical design criterion can be based on the determined visual fields of action.

Preferably, the optical design criterion is selected among the following group:
- position and level of powers and/or aberrations in a multi-focal progressive lens,
- position and level of powers and/or aberrations in a mono-focal lens,
- size and/or shape of monocular and binocular field,
- gradient of astigmatism and/or power,
- stability of the magnification power of a lens according to the eye eccentricity,
- presence of a UV-protective coating,
- presence of a blue light-protective coating,
- gradient of retinal flow,
- gradient of magnification,
- global distortions according to the eye eccentricity,
- retinal and/or optical flow, and/or is selected among one of the following groups:
- central vision criteria group consisting of: power in central vision, astigmatism in central vision, higher-order aberration in central vision, acuity in central vision, contrast in central vision, prismatic deviation in central vision, ocular deviation, object visual field in central vision, image visual field in central vision, magnification in central vision and a variation of preceding criteria,
- peripheral vision criteria group consisting of: power in peripheral vision, astigmatism in peripheral vision, higher-order aberration in peripheral vision, pupil field ray deviation, object visual field in peripheral vision, image visual field in peripheral vision, magnification in peripheral vision and a variation of preceding criteria,
- global optical criteria consisting of: magnification of the eyes and temple shift.

In a preferred embodiment, the step 150 of determining an optical design criterion may also comprise a step of determining a design rule associated to the optical design criterion, the design rule allowing the determination of a value of the optical design criterion. For instance, if an optical design criterion is a level of global distortions of the lens, the corresponding rule may be to minimize said level of global distortions.

According to another example, if an optical design criterion is a level of contrast in central vision, the design rule corresponding to the design criterion may be maximizing the contrasts in central vision.

According to the above example with the four clusters of sports "Go on, target, balance, interaction", an optical design criterion associated to the cluster "go on" is the retinal optic flow, and the corresponding rule of design may be to homogenize the retinal optical flow, because the retinal optic flow when going forward has to be optimized in order to be homogeneous and as close as possible to the one without lenses (also for emmetrope eyes).

Regarding the cluster "target", the optical design criterion may be a level of aberrations at least in the two localized spots identified in the visual field of action and in an embodiment along all the line of the sight, and the rule associated to that criterion is preferably the minimization of the aberrations.

Regarding the cluster "balance", the optical design criterion may be a level of global distortions, and the corresponding rule may be the minimization of the level of global distortions.

Last, regarding the cluster "interaction", the optical design criterion may be a variation of magnification for a large set of eye directions, and the corresponding rule may be to minimize said variation of magnification, in order to reduce distortion du to the ophthalmic lens.

If the lens to be designed is a progressive lens, the optical design criterion may set the relative proportions and locations of the various zones of the lens corresponding respectively to the far/intermediate/near vision, and may also set the amount and locations of aberrations due to the progressive lens.

Figure 3:
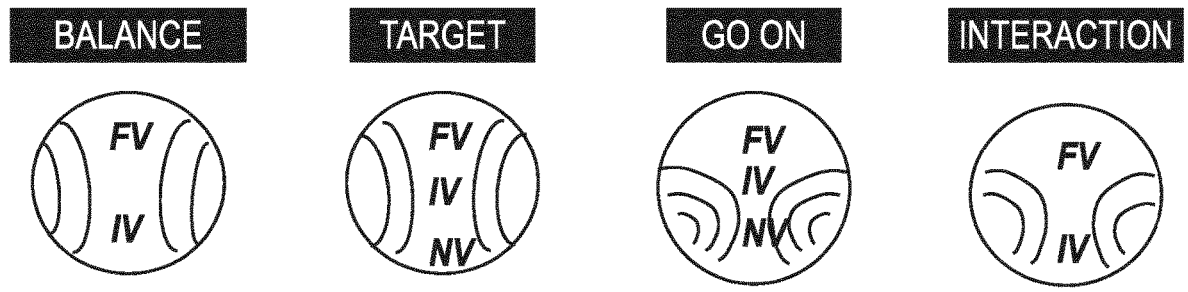
FIG. 3 shows examples of progressive lenses design for each cluster of sports, FIG. 4 schematically shows a device for determining an optical design criterion or for selecting an optical design criterion according to a sport practice performed by the wearer, FIG. 5 schematically shows the main steps of a method for determining an optical design criterion for designing an optical lens adapted to a sport practice according to an embodiment, FIG. 6 schematically shows the main steps of a method for determining an optimized lens design for a selected wearer according to an embodiment.

With reference to FIG. 3, an example is given of the design of progressive lenses for each of the four clusters of sports defined above, in view of the visual field of actions depicted in FIG. 2. Thus for instance the corresponding design of a lens for the cluster "go on" should have a zone corresponding to a forward gaze devoid of any aberration, said zone ensuring sharp vision at any distance among near, intermediate and far vision.

The design of a lens for the cluster "balance" should exhibit low levels of aberrations on peripheral vision and respective zones devoid of aberrations for intermediate and far vision.

The design of a lens for the cluster "target" can exhibit higher levels of aberrations on peripheral vision, but must provide a large zone dedicated to far vision.

The design of a lens for the cluster "interaction" must exhibit a large zone dedicated to far vision devoid of aberrations and another zone devoir of aberrations dedicated to intermediate vision, with low level of aberrations on peripheral vision.

The design of a lens for the cluster "go on" must exhibit a line of sight devoid of aberrations with respective zones for near, intermediate and far vision.

Back to FIG. 5, once the optical design criterion is determined, a record of each cluster, along with each optical design criterion associated to the cluster, is stored in a memory during step 160. The memory may be the memory 12 in which are stored the code instructions executed by the processor, or another memory, for instance a database which the processor can remotely access.

Preferably, the record comprises an identifier of the cluster, as well as an indication of each sport included in the cluster. It can also comprises the scores on each axis of each one of the practices of the sports included in the cluster, or comprise the minimum and maximum score on each axis for a sport to belong to the cluster.

The record may also comprise the, or each visual need corresponding to the cluster and, as the case may be, the rule of design associated to the optical design criterion.

The clusters stored in the memory can then be used for the design of a lens of a wearer.

Method of Determining an Optimized Lens Design

Figure 6:
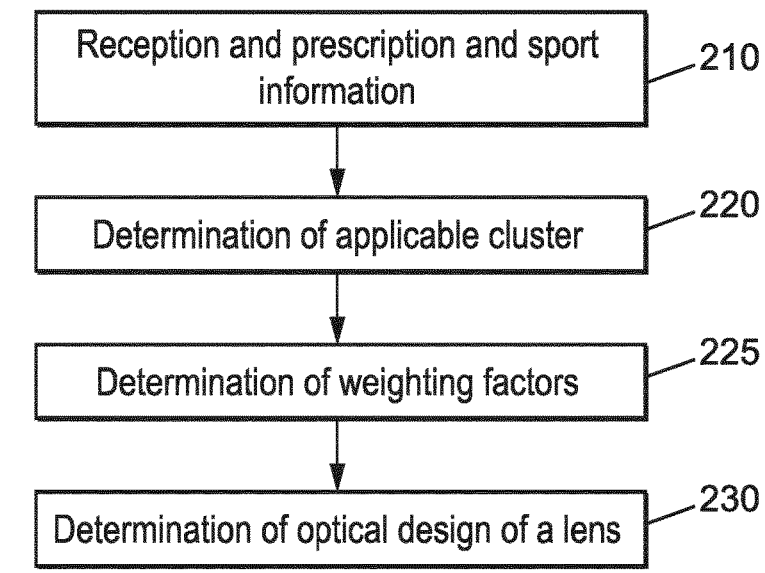

With reference to FIG. 6, a method 200 of determining an optimized lens design according to a given wearer will now be described.

The method is preferably implemented by a computing device 20 comprising a processor 21 and a memory 22 storing code instructions which, can be executed by the processor to perform the method.

It can be the same processor or a distinct processor from the one 11 performing the method of determining an optical design criterion disclosed above, as long as the processor has access to the memory in which are stored the records of the clusters.

The method comprises a first step 210 of the processor receiving a request comprising an optical prescription, and sport practice information relating to an optical device wearer. Preferably, the sport practice information comprises at least an indication of a sport performed by the wearer.

In embodiments, the sport practice information may also comprise, for each sport performed by the wearer:
 the playing level of the wearer in each sport, and
 the relative intensity and/or frequency of each sport practice.

The method then comprises a step 220 of interrogating the memory in which a record of the clusters is stored, to determine at least one cluster of sports applicable to the wearer and the associated optical design criterion.

This step is preferably implemented by identifying, among the clusters stored in the memory, each cluster comprising one of the sports performed by the wearer.

The method then comprises a step 230 of determining an optical design of an optical lens according to both the optical design criterion or criteria, and the optical prescription of the wearer.

The optical design of the lens is therefore adapted to the sport practiced by the wearer.

Preferably, if the wearer practices sports belonging to different clusters, and hence corresponding to different optical design criteria, the method may comprise an additional step 225, prior to step 230, of determining weighting factors of each optical design criterion associated to a determined cluster, based on information regarding the playing level or relative intensity or frequency of each sport practice.

Therefore a priority regarding the optical design criteria to be fulfilled can be established based on the sport practice information of the wearer.

Also, if one cluster is associated to more than one optical design criterion, the step may comprise determination of weighing factors of each optical design criterion corresponding to the same cluster, on the basis of the information regarding the playing level or relative intensity or frequency of the sport practice.

The step 230 of determining the design of a lens may then comprise selecting the design satisfying the criterion having the highest weighing factor.

Figure 7:
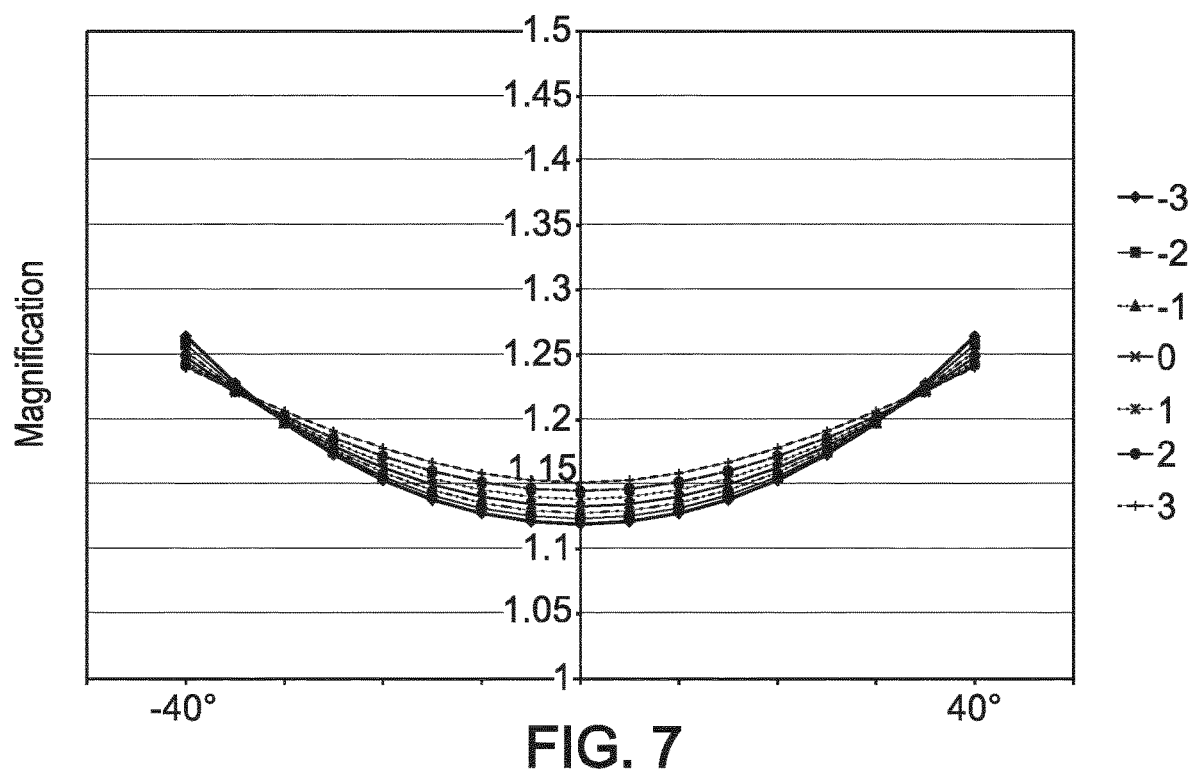
FIG. 7 shows a magnification variation in central vision according to eye eccentricity for different designs of lenses.

A first example of determining a lens design is disclosed below with reference to FIG. 7. This example is based on the example of clusters definition detailed above.

During step 210, the processor receives a request for a lens design comprising a prescription of a non presbyope wearer+2 (0) 0°, the wearer practicing football.

During step 220, the processor determines that football belongs to the cluster "interaction", and that the optical design criterion and the corresponding rule of design is the reduction of magnification variation on the whole lens.

The standard lens given the prescription received regarding the wearer would be a lens made in a material known under the trade name Stylis® with a front base curve of 4.75 D. In FIG. 7 is shown a curve of magnification in central vision with eye eccentricity between −40 and +40 degrees, for several front base curves comprised between 1.75 D and 7.75 D. The scale on the right-hand side of the graph identifies the difference values between the front base curve of the design and the initial front base curve of 4.75 D. Hence a value "−3" corresponds to a front base curve of 1.75 D and a value "0" corresponds to a front base curve of 4.75 D.

The design corresponding to the minimization of magnification variations on the lens is achieved for the lens having a front base curve of 7.75 D. Thus on step 230 the processor determines that the design of the lens should have a frond base curve of 7.75 D.

According to another example, a processor receives during step 210 a prescription of a wearer practicing aerobic for a progressive power lens.

During step 220, the processor determines that aerobic belongs to the cluster "balance", and that the optical design criteria associated to said cluster are:
 a width of unwanted astigmatism at iso 0.25 D at far vision point, determined to fulfill a visual need of having a wide field of vision, and
 a reduction of spatial deformation in order to avoid any swim effect.

In step 225, as there are two criteria to be taken into account for determining the lens design, the processor determines weighing factors for each of the criteria.

The weight associated to the width of unwanted astigmatism can be for instance 0.33 since this need is important for every progressive lens wearer. The weight associated to the reduction of spatial deformation can be determined according to the practice level of the wearer. A beginner moves slower than an experimented wearer, so the weight of this criterion can be fixed to 0 for a complete beginner practicing occasionally and to 1 for a highly experimented person practicing every day. Of course the value of a given wearer can be between 0 and 1 according to the level and frequency and intensity of practice of the wearer.

Alternatively, the value V of the weight attributed to the reduction of spatial deformation may be computed based on the practice level PL, said practice level being comprised between 0 and 1, with the following formula:

$$V=PL/(0.33+PL)$$

In this case the weight W of width of unwanted astigmatism at iso 0.25 D at far vision may also depend upon the practice level with the following formula:

$$W=0.33/(0.33+PL)$$

Considering a wearer which prescription comprises an addition of +2D, a number of lens configurations can be available according to this prescription:
 Lens A, spatial deformation: −30; width of unwanted astigmatism at far vision: 26.6°
 Lens B, spatial deformation: −40, width of unwanted astigmatism at far vision: 31.2°,
 Lens C, spatial deformation: −44, width of unwanted astigmatism at far vision: 32.7°.

A wearer having a practice level of 0 will thus have a weight V of 0 for the spatial deformation, and a weight of 1 for width of unwanted astigmatism, so design C would be chosen at step 230 as providing the best width of unwanted astigmatism. A wearer having a practice level of 1 would have a weight V of 0.75 for spatial deformation and a weight W of 0.25 for unwanted astigmatism so the best design chosen at step 230 would be design A as having the best design for spatial deformation criterion.

The invention claimed is:

1. A method for determining an optical design criterion for designing an optical lens adapted to a selected sport practice, the method comprising:

defining at least one evaluation axis for evaluating sensory and/or motor and/or cognitive requirements or a combination thereof of a sport practice;
for each of a plurality of sports, attributing a score to the sport practice on each defined evaluation axis;
according to the score of each sport practice on each evaluation axis, determining clusters of sports which practices have similar scores;
determining, for each cluster of sports, at least one visual need corresponding to the cluster;
determining, for each cluster, at least one optical design criterion as a function of the associated visual need, wherein the optical design criterion is an optimization parameter to be used in the designing of an optical lens; and
storing, in a memory, a record of each cluster, along with each optical design criterion associated to the cluster.

2. The method according to claim 1, wherein one evaluation axis relates to visual information uncertainty of an environment of a user practicing the sport, and one evaluation axis relates to a type of action implied by the sport practice.

3. The method according to claim 1, wherein one evaluation axis relates to a type of location where the sport practice is performed.

4. The method according to claim 1, wherein the determining a visual need corresponding to a cluster of sports comprises at least one of the following:
evaluation at least one main gaze direction,
evaluation of a width of a field of view,
characterization of a visual motion and/or visual self/motion implied by the sport practice and purpose of the visual motion,
characterization of the need for distance and/or orientation perception implied by the sport practice,
evaluation of an amount of luminosity and/or contrast variation,
evaluation of a need of coordination between eye movement and body segments of a practicing person,
evaluation of use of a master eye during the sport practice,
evaluation of a need of relief perception,
evaluation of a monocular and/or binocular visual need implied by the sensory or motor eye dominance of the sport practice,
evaluation of a need of visual acuity.

5. The method according to claim 1, wherein the visual need corresponding to a cluster of sports is one or a combination of elements of a list consisting of:
visual motion,
ground perception,
fidelity of object,
objects, animals or persons motion perception,
uniform perception of an environment,
uniform perception of displacements of a tracked object, animal or human being,
sharp vision in target gaze direction,
equilibrium in peripheral vision.

6. The method according to claim 5, further comprising:
elaborating, from the determined visual needs, a visual field of action corresponding to a cluster of sports, wherein the visual field of action represents gaze directions of main importance among all gaze directions available given an eye, head and body motion implied by the sport practices of the cluster of sports, wherein the determining at least one optical design criterion for the cluster is implemented based on said visual field of action.

7. The method according to claim 1, wherein the optical design criterion is selected among the following group:
position and level of powers and/or aberrations in a multi-focal progressive lens,
position and level of powers and/or aberrations in a mono-focal lens,
size and/or shape of monocular and binocular field,
gradient of astigmatism and/or power,
stability of a magnification power of a lens according to an eye eccentricity,
presence of a UV-protective coating,
presence of a blue light-protective coating,
gradient of retinal flow,
gradient of magnification,
global distortions according to the eye eccentricity,
retinal and/or optical flow,
and/or is selected among one of the following groups:
central vision criteria group consisting of: power in central vision, astigmatism in central vision, higher-order aberration in central vision, acuity in central vision, contrast in central vision, prismatic deviation in central vision, ocular deviation, object visual field in central vision, image visual field in central vision, magnification in central vision and a variation of preceding criteria,
peripheral vision criteria group consisting of: power in peripheral vision, astigmatism in peripheral vision, higher-order aberration in peripheral vision, pupil field ray deviation, object visual field in peripheral vision, image visual field in peripheral vision, magnification in peripheral vision and a variation of preceding criteria,
global optical criteria consisting of: magnification of the eyes and temple shift.

8. A method for determining an optimized optical lens design for a selected wearer, the method being performed by a processor, the processor being connected to a memory storing records of clusters of sports wherein sports practices of a cluster of sports have similar scores on at least one evaluation axis for evaluating sensory and/or motor and/or cognitive requirements of a sport practice, and each cluster of sports is associated with an optical design criterion which is determined as a function of a visual need induced by the sensory and/or motor and/or cognitive requirements of the sport practices of the cluster of sports, the method comprising:
receiving a request comprising an optical prescription and sport practice information relating to an optical device wearer;
interrogating the memory to infer, based on the sport practice information, at least one cluster of sports applicable to the wearer and the associated optical design criterion; and
determining an optical design of an optical lens according to both the optical design criterion and the optical prescription.

9. The method according to claim 8, wherein the sport practice information comprises at least information regarding a type of sport performed by the wearer, and information regarding at least one of:
a playing level of the wearer in each sport,
a relative intensity and/or frequency of each sport practice.

10. The method according to claim 9, further comprising, if more than one cluster is determined based on the sport practice information, determining weighing factors of each optical design criterion associated to a determined cluster, based on information regarding the playing level or relative intensity or frequency of each sport practice.

11. The method according to claim 9, wherein
at least two optical design criteria are associated to the inferred cluster, and
the method further comprises determining weighing factors of each optical design criterion associated to the inferred cluster, based on information regarding the playing level or relative intensity or frequency of each sport practice corresponding to the inferred cluster.

12. A device for selecting an appropriate optical design criterion as a function of at least a sport practiced by a wearer, the device comprising:
a memory storing a record of clusters of sports along with at least one optical design criterion associated to each cluster, wherein sports practices of a cluster of sports have similar scores on at least one evaluation axis for evaluating sensory and/or motor and/or cognitive requirements of a sport practice, and the at least one optical design criterion is determined as a function of a visual need induced by the sensory and/or motor and/or cognitive requirements of sport practices of the cluster of sports; and
a processor configured to interrogate the memory to infer, from sport practice information associated to an optical device wearer, an optical design criterion applicable to the design of a lens adapted to the wearer.

13. The device according to claim 12, wherein the clusters of sports comprise at least two clusters selected in a list consisting of:
a first cluster of sports performed in a stable environment and dedicated to acquisition or reproduction of body postures, for example said first cluster including at least the following sports: yoga, dance, aerobic, step,
a second cluster of sports performed in a stable environment and dedicated to shoot or aim at a target, for example said second cluster including at least the following sports: fishing, archery, golf, ball-trap,
a third cluster of sports performed in a visually unstable environment and involving forward displacement, for example said third cluster including at least the following sports: cycling, running, walking, horse-riding, skiing, and
a fourth cluster of sports performed in a visually unstable environment and involving frequent changes of directions, for example said fourth cluster including at least the following sports: table tennis, handball, football, tennis.

14. The device according to claim 13, wherein the optical design criterion associated to the clusters of sports is:
for the first cluster of sports: a level of global distortions,
for the second cluster of sports: a level of aberrations in a central zone of the lens,
for the third cluster of sports, a retinal optic flow,
for the fourth cluster of sports: a variation of magnification for a large set of eye directions.

15. The device according to claim 13, wherein the processor is further configured to determine, based on the optical design criterion and an optical prescription of the wearer, an optical design of an ophthalmic lens of the wearer.

* * * * *